United States Patent [19]

Joannou

[11] 3,836,155

[45] Sept. 17, 1974

[54] PHONOGRAPH RECORD PLAYER TONE ARM ASSEMBLY

[76] Inventor: Constantinos J. Joannou, 2008 Dorval Ave., Ottawa, Ontario, Canada K1G 2N8

[22] Filed: Feb. 12, 1973

[21] Appl. No.: 331,389

[30] Foreign Application Priority Data

Feb. 21, 1972 Canada ................................ 135161

[52] U.S. Cl. ................................ 274/23 R, 274/37

[51] Int. Cl. ................................ G11b 3/18

[58] Field of Search ................................ 274/23 R, 37

[56] References Cited

UNITED STATES PATENTS

| | | | |
|---|---|---|---|
| 2,769,929 | 11/1956 | Hardway, Jr. | 274/37 R |
| 2,961,244 | 11/1960 | Glenn | 274/37 |
| 3,028,161 | 4/1962 | Siebert | 274/23 R |
| 3,556,537 | 1/1971 | Stacy | 274/23 R |
| 3,647,224 | 3/1972 | Klein | 274/23 R |
| 3,682,485 | 8/1972 | Guha | 274/23 R |

*Primary Examiner*—Louis R. Prince

*Assistant Examiner*—Charles E. Phillips

[57] ABSTRACT

In modern phonograph record players, where needle pressure is low and needle compliance is high, friction in the tone arm bearings is not tolerated. This invention provides for a tone arm system in which static friction is eliminated by using a stretched chord suspension and viscous fluid to dampen oscillations.

3 Claims, 6 Drawing Figures

PHONOGRAPH RECORD PLAYER TONE ARM ASSEMBLY

This invention relates to a phonograph record player in which the tone arm is designed to eliminate static friction.

The present state of the art in record players provides for very light pressure pick-up cartridges with high compliance. To use these cartridges the record player tone arm has to have very low friction. In the present state of the art, friction is eliminated by using fine bearings, or even jewel bearings, which are relatively expensive because they require precision machining.

It is the object of my invention to eliminate the friction in the tone arm suspension system more effectively.

Another object of my invention is to provide means for minimizing resonant vibrations in the tone arm system.

Another object of my invention is to provide a record player having the above mentioned features with a minimum of machining required in its manufacture.

These and other objects of my invention will become more apparent in the detailed descriptions which follow.

In drawings which illustrate embodiments of my invention,

Figure 1:
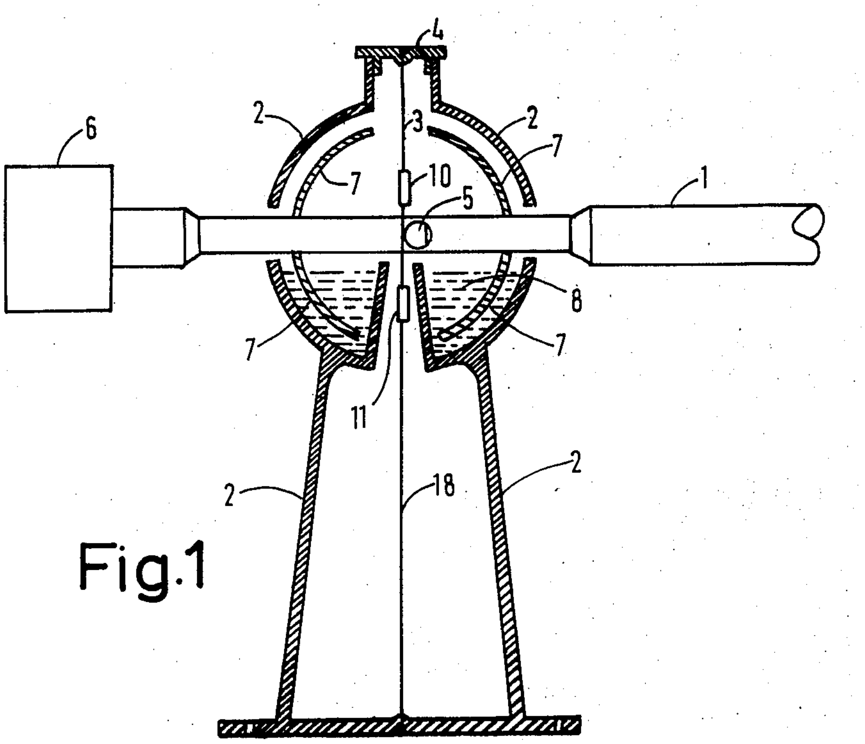
FIG. 1 shows the tone arm suspension system and the cross section of the supporting member.
Figure 2:
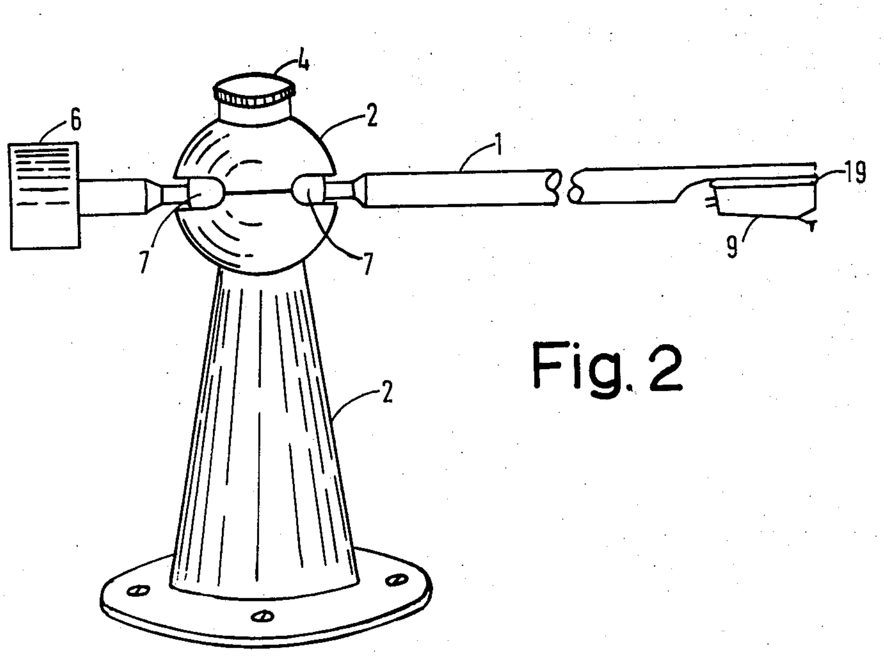
FIG. 2 is a pictorial view of the tone arm and supporting member.

Referring to FIG. 1, showing the tone arm system, 1 is the tone arm proper; 2 is the supporting member of the arm which also houses the arm suspension and damping system; 6 is a counter weight for balancing the cartridge at the other end of the arm; 4 is a control for adjusting the anti-skating torque on the arm proper. Tone arm 1 is made thinner near the suspension point as shown in FIG. 2. At the suspension point, a small shaft 5 attached to the tone arm is shown. Shaft 5 has slots 12 and 13. Cord 16 is wound around shaft 5 and passes through slot 12 and is prevented from slipping by screw 14 which, when tightened, makes slot 12 narrower and squeezes cord 16. Cord 17 is wound around the other side of shaft 5, as shown, and it passes through slot 13. Screw 15, when tightened, makes slot 13 narrower and squeezes cord 17, thus preventing it from slipping. One end of cord 16 and one end of cord 17 are attached to the ends of U-shaped member 10. The other end of cord 16 and cord 17 are attached to U-shaped member 11. One end of cord 18 is attached to the middle of U-shaped member 11, and the other end of cord 18 is attached to the bottom of supporting member 2. One end of cord 3 is attached to the middle of U-shaped member 10, the other end of cord 3 is attached to anti-skating adjusting control 4. Control 4 is located at the top of member 2 and is free to rotate with respect to support member 2. 7 is a hollow shell attached to arm 1 and open at its top and bottom to allow cords 3 and 18 (FIG. 3 and FIG. 4) to pass through.

Shell 7 is partly immersed in a viscous fluid 8 which is contained in supporting member 2.

Operation of the tone arm suspension system is as follows:

Cords 16, 17, 18 and 3 are under tension. When the tone arm proper rotates horizontally while playing a record, cords 3 and 18 twist, thus allowing the arm to rotate freely without friction. When the arm is rotated vertically (pick-up lifted or lowered), shaft 5 rotates with the tone arm, and cords 16 and 17 wind on one side of shaft 5 and unwind on the other side of shaft 5, thus allowing again the arm to rotate freely in the vertical direction without friction. The function of shell 7 which is immersed in fluid 8 is to provide viscous damping and thus to prevent the arm from oscillating due to the elasticity of the cords and the mass of the arm. The viscous fluid 8 and shell 7 also eliminate any higher frequency vibrations which may be set up in the tone arm itself. Anti-skate torque is applied to the tone arm by turning control knob 4 and thus twisting cord 3.

Figures 3, 4, 5:
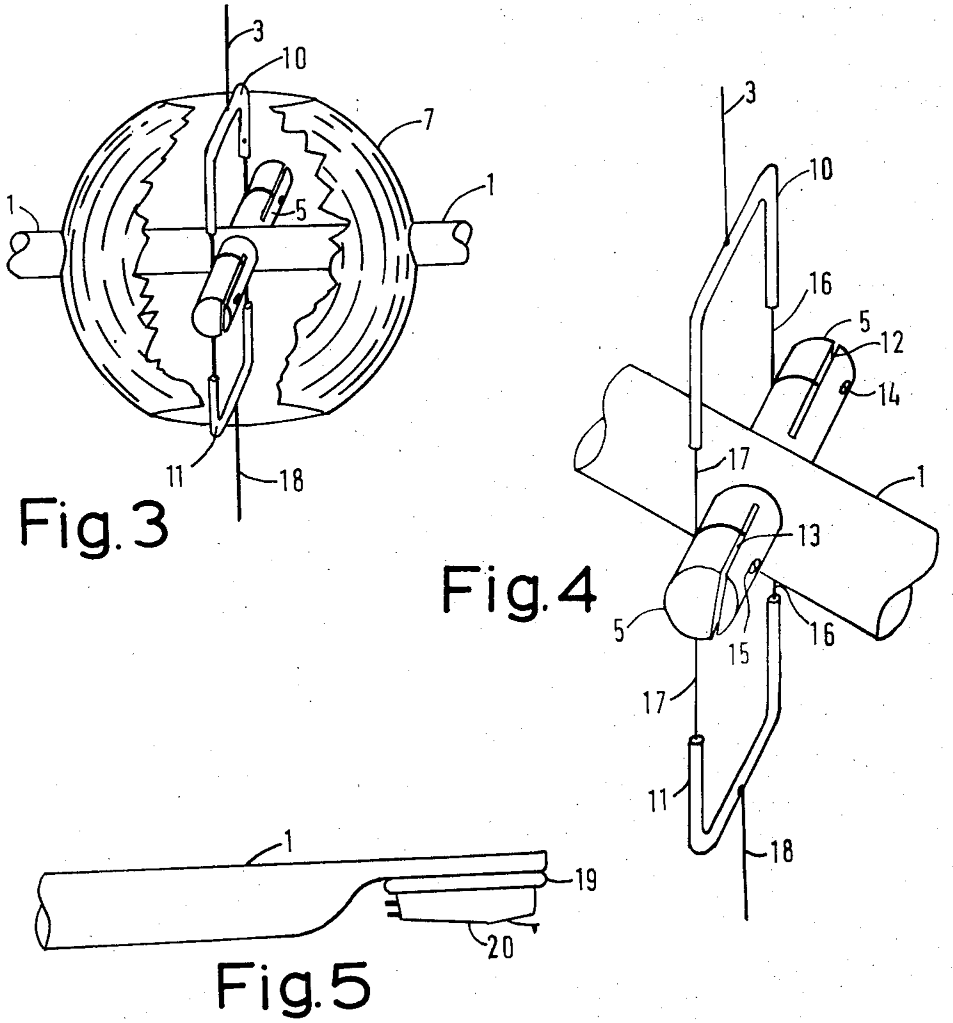
FIG. 3 shows the tone arm suspension system with the hollow shell.
FIG. 4 shows the tone arm suspension system in still greater detail.
FIG. 5 shows the cartridge mounting pad.
Figure 6:
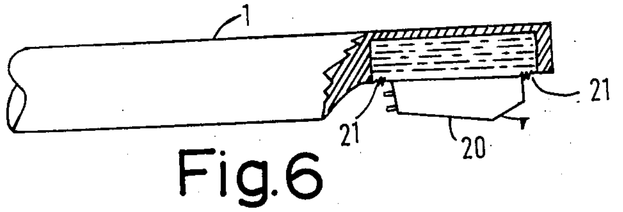
FIG. 6 shows an alternate cartridge mounting arrangement.

In FIG. 5, 19 is a pad which is hollow inside and is made of some elastic material, like rubber. The pad inside is filled with viscous fluid. Pad 19 is affixed to the tone arm on one side. Pick-up cartridge 20 is attached to the other side of the pad. The function of this arrangement is to eliminate any vibrations which may be set up by the cartridge onto the tone arm and vice versa. FIG. 6 shows an alternate method of supporting the pick-up cartridge to the tone arm. The tone arm is made hollow to accommodate the viscous fluid. The bottom wall of this hollow cavity is made of an elastic membrane 21. Cartridge 20 is attached to membrane 21.

What I claim is:

1. A phonograph record player tone arm assembly comprising a tone arm member, a stationary hollow vertical supporting member forming the housing of the tone arm assembly, a suspension system comprising a short cylindrical shaft affixed to said tone arm member, said shaft extending from each side of said tone arm; two flexible cords each wound around an end of said shaft and said cords being affixed to said shaft at about the middle of their wound lengths, one upper end of each of said cords being attached to one end of a third vertical flexible cord via a first rigid U-shaped member, the other end of said third cord being attached to a knob, said knob being rotatably attached to the top of said hollow vertical supporting member; the lower ends of said cords being attached to one end of a fourth flexible cord via a second U-shaped rigid member; the other end of said fourth flexible cord being attached to the lower inside end of said hollow supporting member; a damping system for damping oscillations in the tone arm system consisting of a rigid member attached to said tone arm near said shaft and said rigid member being immersed in a viscous fluid, said fluid being contained in a hollow section internal to said hollow supporting member which forms the stationary part of the tone arm assembly.

2. A phonograph record player tone arm assembly as defined in claim 1 having a pick-up cartridge attached to the tone arm via a hollow container containing a viscous fluid, said container being made of elastic material.

3. A phonograph record player tone arm assembly as defined in claim 1 having a pick-up cartridge attached to a flexible membrane, said membrane being attached to said tone arm in such a way as to form a cover covering a hollow cavity in the said tone arm and said cavity in said tone arm being filled with a viscous fluid.

* * * * *